INFRARED SPECTRUM OF 3-(1-METHYL-2-PROPENYL)-CYCLODODECATRIENE

INFRARED SPECTRUM OF 3-(3-BUTENYL)-CYCLODODECATRIENE

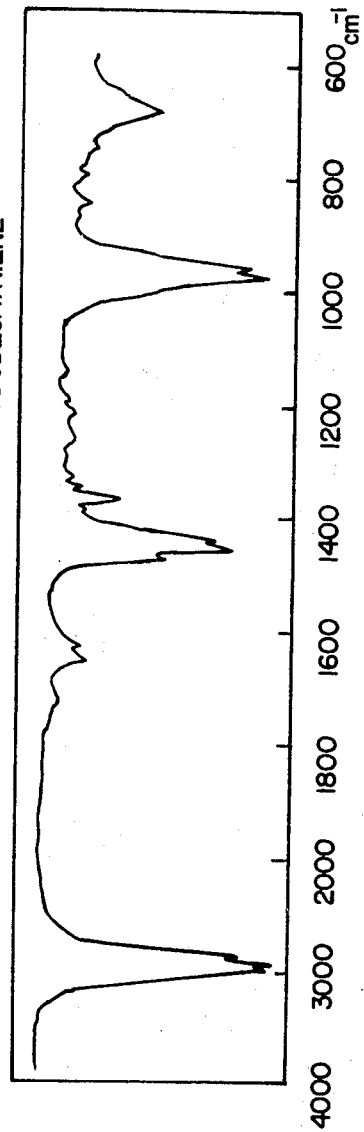

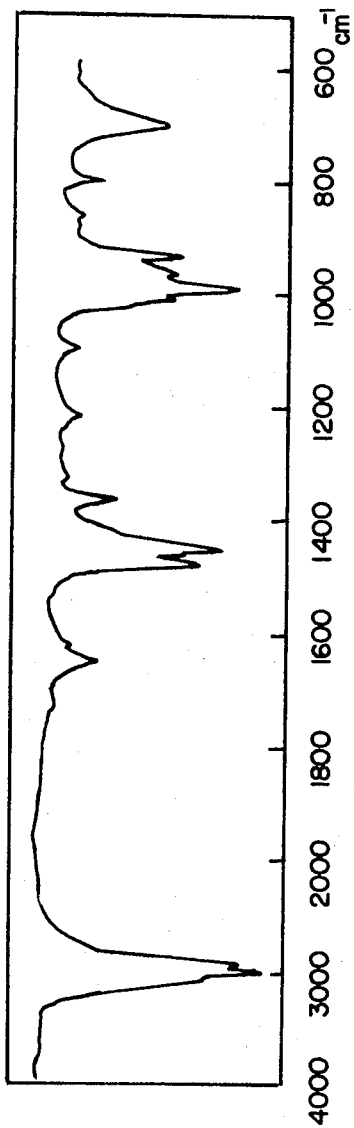

United States Patent Office 3,658,926
Patented Apr. 25, 1972

3,658,926
BUTADIENE OLIGOMERS AND PRODUCTION THEREOF
Hiroyuki Morikawa, Ami-machi, Japan, assignor to Mitsubishi Petrochemical Company Limited, Tokyo, Japan
Filed Dec. 14, 1970, Ser. No. 97,764
Int. Cl. C07c 3/00
U.S. Cl. 260—666 B      12 Claims

ABSTRACT OF THE DISCLOSURE

Butadiene-1,3 and a specific chain dimer thereof are caused to undergo cyclic cotrimerization in contact with a Ziegler catalyst comprising, in combination, a specific titanium compound (e.g., titanium tetrabutoxide), a specific electron-donor compound (e.g., triphenyl phosphine) and a specific organic aluminum compound (e.g., diethylaluminum). Alternatively, butadiene is caused to contact a catalyst comprising, in combination, a cobalt or iron compound, a chromium or nickel compound, and a trialkylaluminum.

By this process, new compounds 3-(1-methyl-2-propenyl)-cyclododecatriene, 3 - (3-butenyl)-cyclododecatriene, and 3-(1-methyl-2-propenyl)-cyclooctadiene are produced.

BACKGROUND OF THE INVENTION

This invention relates generally to butadiene oligomers. More particularly, the invention relates to new butenyl cyclododecatrienes corresponding to tetramers of butadiene and relates to a new process for producing these new oligomers.

Butenyl-substituted cyclododecatrienes are compounds having both olefin bonds of open-chain form and closed-chain or cyclic-chain olefin bonds and can be considered to be new compounds. These compounds have high utility as cross-linking monomers of so-called EPT rubbers and for other uses.

For producing such butenyl-substituted cyclododecatrienes, the process of butenyl substituting a cyclododecatriene-(1,5,9) obtained by cyclic trimerization of butadiene-1,3 would appear to be a suitable method. However, even if such a method were possible, it would undoubtedly necessitate the use of starting materials other than butadiene and other conditions which, industrially, cannot be said to be desirable.

SUMMARY OF THE INVENTION

It is an object of the present invention, generally stated, to produce these useful compounds through the use of only butadiene as an essentially starting material and by the application of a technique wherein use is made of Ziegler-type catalysts on which ample information has already been accumulated.

More specifically, an object of the invention is to provide a novel compound: 3 - (1-methyl-2-propenyl)-cyclododecatriene.

Another object of the invention is to provide a novel compound: 3-(2-butenyl)-cyclododecatriene.

Still another object of the invention is to provide a novel compound: 3-(3-butenyl)-cyclododecatriene.

A further object of the invention is to provide a novel compound: 3-(1-methyl-2-propenyl)-cyclooctadiene.

An additional object of the invention is to provide a novel process for producing the above-mentioned butadiene tetramers from butadiene dimer and butadiene.

Another additional object of the invention is to provide a novel process for producing the above-mentioned butadiene tetramers from only butadiene.

According to the present invention in one aspect thereof, briefly summarized, there is provided a process for producing butadiene oligomers in which a specific chain dimer of butadiene-1,3 and butadiene-1,3 are caused to undergo cyclic cotrimerization in contact with a Ziegler-type catalyst comprising a combination of a specific titanium compound (I), a specific electron-donor compound (II), and a specific organic aluminum compound (III) thereby to produce the above enumerated butadiene oligomers, particularly 3-R-cyclododecatriene-(1,5,9), where R is a butenyl group representable by

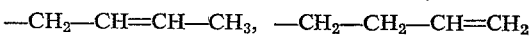

or

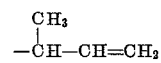

According to the present invention in another aspect thereof, there is provided a process for producing butadiene oligomers in which butadiene is caused to contact a catalyst comprising a combination of a transition metal compound (IV), a transition metal compound (V), and a trialkylaluminum (VI) thereby to produce a butadiene oligomer having butenyl or isobutenyl groups.

The nature, principle, and utility of the invention will be more clearly apparent from the following detailed description beginning with general aspects and features of the invention and concluding with several specific examples of practice illustrating preferred embodiments thereof.

BRIEF DESCRIPTION OF THE DRAWING

In the drawing, FIGS. 1 through 4, inclusive, are graphical representations (spectrum charts) of infrared spectrums of novel compounds (butadiene oligomers) produced in accordance with the invention.

DETAILED DESCRIPTION (1) Butadiene tetramer from butadiene dimer and butadiene The process of producing butadiene oligomers in accordance with this invention, in one aspect thereof, comprises causing a chain dimer, (1) of butadiene-1,3 representable by the general formula $$CH_2=CH-CH=CH-R$$

Figure 1:
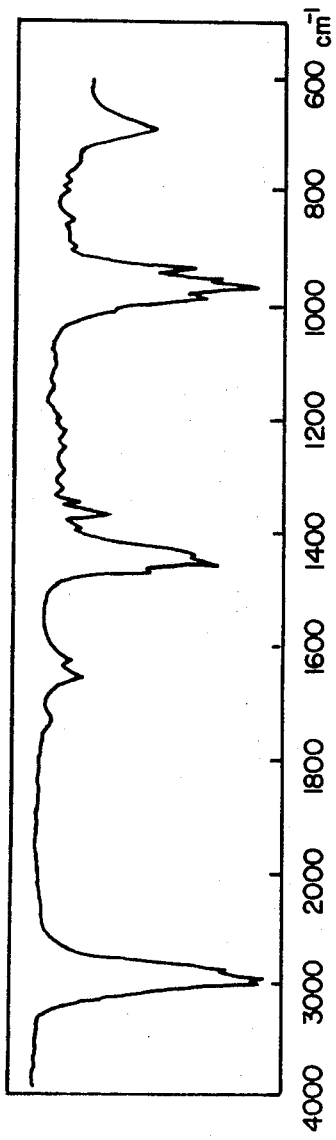

and butadiene-1,3, (2) to undergo cyclic cotrimerization in contact with a Ziegler-type catalyst prepared by combining a titanium compound I, representable by the general formula $Ti(OR^1)_n X_{4-n}$ or $TiOX_2$, an electron-donor compound II, representable by the general formula $AR^2_m$, and an organic aluminum compound III, representable by the general formula $AlR_2^3 X$ or $Al_2 R_2^3 X_3$ thereby to form 3-R-cyclododecatriene-(1,5,9).

In the above general formulas, R is a butenyl group selected from —CH$_2$—CH=CH—CH$_3$,

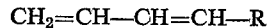

and

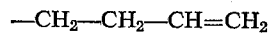

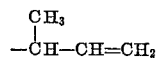

$R^1$, $R^2$, and $R^3$ are respectively hydrocarbon residues selected from alkyl groups and aryl groups. X is a halogen. A is an element selected from phosphorus, antimony, and sulfur. $n$ is an integer from 0 to 4, and $m$ is the valence of the element A.

Thus, the starting materials of the process of this invention, in the instant aspect thereof, are butadiene-1,3 itself, that is, the monomer, and a chain dimer thereof. The resulting product of formation has been confirmed by the gas chromatograph, infrared-absorption spectrum, and nuclear magnetic resonance spectrum methods, by identification of hydrogenated substances, by treatment with anhydrous maleic acid, and by other measures to have the following structural formula.

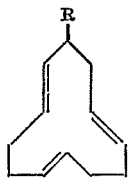

Where

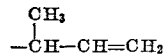
$R= -CH_2-CH=CH-CH_3, -CH_2-CH_2-CH=CH_2,$
or $$-\overset{CH_3}{\underset{|}{CH}}-CH=CH_2$$

As is apparent from this formula, the four olefin bonds are all non-conjugate and, moreover, are divided into an alkenyl (butenyl) part and a cycloolefin part of different reactivities. Accordingly, various uses for this compound in addition to those mentioned hereinbefore can be considered.

One of the starting materials in the process according to the instant embodiment of this invention is a chain dimer, (1) of butadiene-1,3 representable by the general formula set forth hereinbefore, that is n-octatriene-(1,3,6)
n-octatriene-(1,3,7), or
3-methylheptatriene-(1,4,6).

These compounds are known and can be prepared by any known method such as dimerization of butadiene-1,3. For example, these compounds can be readily obtained from butadiene-1,3 through the use of a cobalt or nickel complex catalyst.

The other starting material (2) butadiene-1,3, can be used directly in its state of a so-called B—B fraction.

The stoichiometric quantitative ratio of the starting materials (1)/(2) is 1:2 as a mole ratio and 1:1 as a weight ratio. I have found, however, that a suitable weight ratio in actual practice is in the range from 0.1 to 10, preferably from 0.5 to 5.

As stated hereinbefore, the process of this invention is carried out, in general, with the starting materials in contact with a Ziegler-type catalyst comprising a combination of a titanium compound and an organic aluminum compound. For these two components, various compounds known to be suitable for this class of catalyst can be used. Furthermore, the term "Ziegler-type catalyst comprising a combination of a titanium compound and an organic aluminum compound" is herein used to include not only catalysts consisting of only these two components but also catalysts of these two components which have been modified with compounds such as various electron-donor compounds and metal compounds.

Heretofore, the reactivity of cyclic homotrimerization of an alkyl-substituted butadiene-1,3 has been considered to be extremely deficient. In fact, the yields of cyclic homotrimers of compounds such as pentadiene and isoprene are remarkably lower than that of butadiene-1,3, and a butadiene chain dimer representable by the general formula set forth hereinbefore cannot, by itself, undergo a cyclic homotrimerization reaction.

However, as I have previously discovered in the case of cyclic cotrimerization of methyl-substituted butadiene-1,3 and butadiene-1,3 (as disclosed in U.S. patent application No. 856,499, filed on Sept. 9, 1969 entitled "Production of Cyclic Trimers of Dienes") instances wherein the reactivity of a substituted butadiene-1,3 is improved in cyclic cotrimerization with butadiene-1,3 can be confirmed.

A particularly suitable catalyst for promoting the cyclic cotrimerization reaction of this invention is a combination of the aforementioned components I, II, and III. These three components are specifically defined as follows.

(I) Titanium compound representable by the general formula $Ti(OR^1)_nX_{4-n}$ or $TiOX_2$, wherein: $R^1$ independently of $R^2$ and $R^3$, is an alkyl group or an aryl group of the order of $C_1$ to $C_{10}$, particularly a lower ($<C_6$, approx.) alkyl group or phenyl group; X is a halogen, particularly chlorine or bromine; and $n$ is an integer from 0 through 4. Specific examples of this titanium compound are as follows:

titanium tetramethoxide
titanium tetraethoxide
titanium tetrapropoxide
titanium tetrabutoxide
titanium tetraphenoxide
titanium tetrachloride titanium tetrabromide
titanium tributoxychloride
titanium dibutoxydichloride
titanium butoxytrichloride
titanyl dichloride
titanyl dibromide (II) Electron-donor compound representable by the general formula $AR^2_m$. Depending on the kind of A, this compound can be divided into three clases, $PR_3^2$, $SbR_3^2$, and $SR_2^2$. In all cases, $R^2$ is an alkyl group or an aryl group of the order of $C_1$ to $C_{10}$, particularly a lower ($<C_6$, approx.) alkyl group or phenyl group, independently of $R^2$ and $R^3$. The two groups (in the case of $SR_2^2$) or three groups (in the case of $RR_3^2$ and $SbR_3^2$) of this $R^2$ bonded with A are the same in one compound in certain cases and are respectively different in other cases. Specific examples of this electron-donor compound are as follows:

triethylphosphine
tripropylphosphine
tributylphosphine
trihexylphosphine
trioctylphosphine
triphenylphosphine
triethylantimony tributylantimony
triphenylantimony
diethyl sulfide
dipropyl sulfide
dibutyl sulfide
diphenyl sulfide (III) Organic aluminum compound representable by the general formula $AlR_2^3X$ or $Al_2R_3^3X_3$, wherein $R^3$, independently of $R^1$ and $R^2$, is an alkyl group or aryl group of the order of $C_1$ to $C_{10}$, particularly a lower ($<C_6$, approx.) alkyl group or phenyl group, and X is a halogen group, particularly chlorine, Specific examples of this organic aluminum compound are as follows:

dimethylaluminum chloride
diethylaluminum chloride
diisopropylaluminum chloride
dibutylaluminum chloride
diisobutylaluminum chloride
dioctylaluminum chloride
diphenylaluminum chloride
ethylaluminum sesquichloride
butylaluminum sesquichloride
isobutylaluminum sesquichloride In the preparation of the catalyst from the above defined three components, the preferable procedure is to mix components I and II first and then to add component III thereto. I have found that other preparation procedures tend to result in a lowering in the yield of the cyclic cotrimer.

The suitable combining proportions of these components, in general, are such that the mol ratio of components II/I is from 0.1 to 3, preferably from 0.5 to 2, and the mol ratio of components III/I is from 1 to 50, preferably from 3 to 15.

While the reaction can be carried out with or without a solvent, it is generally suitable and convenient to carry out the process operation in the presence of a solvent. Typically representative examples of usable solvents are hydrocarbons such as benzene, toluene, xylene, hexane, and heptane. The aforedescribed two starting materials are mixed beforehand in this solvent or are supplied separately.

The reaction is carried out at a reaction temperature of from 0 to 100 degrees C., particularly from 20 to 70 degrees C. and under atmospheric pressure or a pressure thereabove.

(2) Butadiene tetramer from butadiene

While it can be said that, in the above described process, ostensibly only butadiene is used as a starting material, it is necessary to synthesize butadiene dimer separately. Accordingly, if it were possible to produce the objective cyclic oligomers by starting strictly from the butadiene monomer, a further advantage would be attained.

I have found that the object of this invention to solve this problem can be achieved by using compounds of two specific kinds of metals for the transition metal component of the Ziegler-type catalyst.

Accordingly, the process for producing butadiene oligomers according to this invention, in another aspect thereof, comprises causing butadiene to contact a catalyst comprising a combination of compounds IV, V, and VI specified below thereby to form cyclic oligomers of butadiene each having a butenyl group or an isobutenyl group.

(IV) A compound of a transition metal selected from cobalt compounds, and iron compounds.

(V) A compound of a transition metal selected from chromium compounds and nickel compounds.

(VI) A trialkylaluminum.

This catalyst of the invention comprises a combination of the above defined three indispensable components. The absence of one of these three components precludes the production of the objective reaction product. For example, with the use of a catalyst prepared by combining a transition metal compound (IV) and a trialkylaluminum (VI), only a chain dimer of butadiene can be formed, while, with the use of catalyst prepared by combining a transition metal compound (V) and a trialkylaluminum (VI), only a cyclic trimer of butadiene can be formed. Furthermore, the use of a catalyst consisting of a combination of transition metal compounds (IV) and (V), oligomers cannot be obtained.

The above defined three components will now be described in greater detail.

(IV) Cobalt and iron compounds

Examples of compounds are halogen compounds (particularly chlorides), carbonates, organic acid salts (particularly aliphatic carboxylic acid salts and naphthenic acid salts), and diketone salts (particularly β-diketone salts (above all those containing aliphatic lower acyl groups and lower acyl acetic acid esters)). The cobalt and iron in these compounds may each be of any valence.

Specific examples of these compounds (IV) are: cobalt chloride, cobalt carbonate, cobalt naphthenate, cobalt stearate, cobalt acetylacetonate, cobalt acetoethyl acetate, ferric (ferrous) chloride (anhydrous), iron acetylacetonate, iron acetate, and iron acetoethyl acetate.

(V) Chromium and nickel compounds

Representative examples of chromium compounds are halogenides (particularly chlorides) and oxyhalogenides (particularly oxychlorides). Representative examples of nickel compounds are halogenides (particularly chlorides), organic acid salts (particularly aliphatic carboxylic acid salts and naphthenic acid salts), and diketone salts (particularly β-diketone salts (above all those containing aliphatic lower acyl groups and lower acyl acetic acid esters)). The chromium and nickel in these compounds may each be of any valance.

Specific examples of these compounds (V) are: chromium chloride, chromyl chloride, nickel chloride (anhydrous), nickel formate, nickel naphthenate, nickel stearate, nickel acetylacetonate, nickel acetoethyl acetate, and nickel cyanate.

(VI) Trialkylaluminums (alkyls including cycloalkyls and alkenyls)

Representative examples of these compounds are those with alkyl groups having carbon numbers (numbers of carbon atoms) of the order of from 1 to 10, particularly lower alkyl groups. The three alkyl groups in each compound may be the same or be respectively different.

Specific examples of these compounds (VI) are: trimethylaluminum, triethylethylaluminum, tripropyl (n-, iso-) aluminum, tributyl (n-, iso-, tertiary) aluminum, trihexylaluminum, and tricyclohexylaluminum.

Each of the above described three indispensable components to be combined to form the catalyst of this invention may be a mixture of substances. While these three components may be combined at one time or in staggered sequence, I have found that, in general, the procedure of first causing transition metal compounds (IV) and (V) to contact the starting material and then adding the aluminum compound (VI). The addition and mixing of the components are carried out by an ordinary method for the preparation of catalysts of this kind with the materials in a state wherein active impurities which can become catalysts poisons are absent, e.g., in an atmosphere of an inert gas, and in a hydrocarbon solvent.

These three components are combined in proportions such that, in general, the mol ratio of the transition metal compounds (I)/(II) is from 1:1 to 10:1, particularly from 2:1 to 5:1, while the mol ratio of the compounds (VI)/(IV+V) is from 3:1 to 30:1, particularly from 5:1 to 10:1.

Except for the use of a catalyst of the above described character, the process of the invention can be practiced by any mode adaptable for this kind of polymerization reaction. Accordingly, the process may be carried out by causing butadiene to contact the above described catalyst in the presence of a suitable solvent as, for example, a hydrocarbon (e.g., benzene, toluene, xylene, hexane, and heptane—a reaction without a solvent also being possible), at a temperature of from 0 to 100 degrees C., particularly from 30 to 80 degrees C., and under atmospheric or higher pressure. For the butadiene, it is possible to use a butadiene containing a small quantity of other 1,3-dienes.

Upon completion of the reaction, the solvent used is removed, and the resulting process materials are subjected to a further fractional distillation, whereupon the desired butadiene oligomers are obtained.

The butadiene cyclic oligomers produced in accordance with the invention can be considered to be new compounds and are butenyl-substituted and isobutenyl-substituted cyclododecatrienes and cyclooctadienes representable by the following formulas.

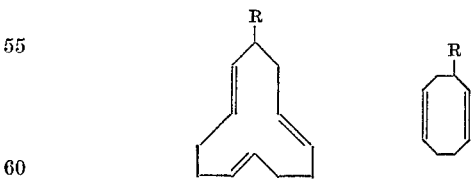

In the above formulas, R is a group representable by

—$CH_2$—CH=CH—$CH_3$ or

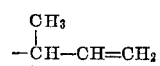

I have found that these butadiene cyclic oligomers can be used as third components for cross linking in EPT rubbers and as alicyclic epoxy resin starting materials. Furthermore, by causing these oligomers to undergo copolymerization with olefins, novel polymers containing cyclopolyolefins in side chains can be produced.

DETERMINATION OF THE STRUCTURE

(1) 3-(1-methyl-2-propenyl)-cyclododecatriene

The boiling point of this compound is 110° C.–115° C./1.5 mm. Hg (tetramer fraction). The results of elemental analysis (Found: C, 88.75%; H, 11.25%) and molecular weight determination (M.W.=216) by the mass spectrum method indicate that this compound is a tetramer of butadiene. This compound absorbs 4 mols of hydrogen and does not react with maleic anhydride, which shows the existence of the double bond (unconjugated, tetraene).

In the infrared spectra (shown in FIG. 1) the absorption of the double bond (1640 cm.$^{-1}$, 1650 cm.$^{-1}$), that of the methyl groups (1374 cm.$^{-1}$), that of the terminal vinyl group (915 cm.$^{-1}$, 1000 cm.$^{-1}$), that of the trans double bond (965 cm.$^{-1}$) are indicated. In the nuclear magnetic resonance spectra, the absorption of the protons of the olefin (4.2–5.0τ, —CH=CH—), those of the methine and methylene group (7.6–7.7τ, —CH—, 7.8–7.9τ, —CH$_2$—C=C—) and those of the methyl group (8.95–9.0τ, —CH$_3$) were found, and the ratio of peak areas was 9:12:3 respectively. Moreover, in the hydrogenated product of this compound, the ratio of the methyl proton to the methine and methylene proton was 6:26. These results accord with 3-(1-methyl-2-propenyl)-cyclododecatriene.

(2) 3-(3-butenyl)-cyclododecatriene

The boiling point, elemental analysis, molecular weight determination, hydrogenation, and the reaction with maleic anhydride is similar to the preceding oligomer product.

Figure 2:
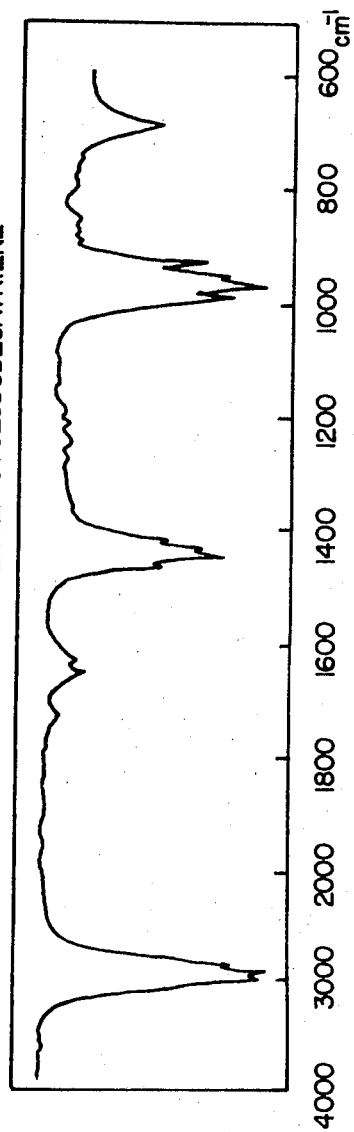

In the infrared spectra (shown in FIG. 2) the absorption of the double bond is similar to the aforedescribed product except for the absence of methyl group (1374 cm.$^{-1}$). In the nuclear magnetic resonance spectra, the absorption of the protons of the olefine (4.2–5.0τ) and those of the methine/methylene (7.6–7.7τ, 7.8–7.9τ) were found, and the ratio of peak areas was 9:15 respectively. Moreover, in the hydrogenated product of this compound the ratio of the methyl proton to the methine/methylene proton was 3:29. These results accord with 3-(3-butenyl)-cyclododecatriene.

(3) 3-(2-butenyl)-cyclododecatriene

The boiling point of this compound is 111° C.–118° C./1.5 mm. Hg (tetramer fraction). The results of elemental analysis (Found: C, 88.75%; H, 11.25%) and molecular weight determination (M.W.=216) by the mass spectrum method indicate that this compound is a tetramer of butadiene. This compound absorbs 4 mols of hydrogen and does not react with maleic anhydride, which shows the existence of the double bond (unconjugated, tetraene).

In the infrared spectra (shown in FIG. 3), the absorption of the double bond (1640 cm.$^{-1}$, 1650 cm.$^{-1}$), that of the methyl group (1374 cm.$^{-1}$), that of the trans double bond (965 cm.$^{-1}$), and that of the cis double bond (712 cm.$^{-1}$) were found. In the nuclear magnetic resonance spectra, the absorption of the protons of the olefin (4.2–5.0τ, —CH=CH—), those of the methine and methylene group (7.6–7.7τ, —CH—, 7.8–7.9τ, —CH$_2$—C=C) and those of the methyl group adjacent to a double bond (8.3–8.45τ, —C=C—CH$_3$) were found, and the ratio of peak areas was 8:13:3 respectively. Moreover, in the hydrogenated product of this compound, the ratio of the methyl proton to the methine and methylene proton was 3:29. These results accord with 3-(2-butenyl)-cyclododecatriene.

(4) 3-(1-methyl-2-propenyl)-cyclooctadiene-(isobutenyl-cyclooctadiene)

The boiling point of this compound is 90° C.–95° C./2 mm. Hg (trimer fraction). The results of elemental analysis (Found: C, 88.76%; H, 11.24%), and molecular weight determination (M.W.=162) by the mass spectrum method indicate that this compound is a trimer of butadiene. This compound absorbs 3 mols of hydrogen and does not react with maleic anhydride, which shows the existence of the double bond (unconjugated, triene).

In the infrared spectra (shown in FIG. 4), the absorption of the double bond (1640 cm.$^{-1}$), that of the terminal vinyl group (915 cm.$^{-1}$, 1000 cm.$^{-1}$), and that of the cis double bond (714 cm.$^{-1}$) were found. In the nuclear magnetic resonance spectra, the absorption of the protons of the olefin (4.2–5.0τ, —CH=CH—), those of the methine and methylene group (7.6–7.7τ, —CH—, 7.8–7.9τ, —CH$_2$—C=C—) and those of the methyl group (8.95–9.0τ, —CH$_3$) were found, and the ratio of peak areas was 7:8:3 respectively. Moreover, in the hydrogenated product of this compound, the ratio of the methyl proton to the methine and methylene proton was 6:18. These results accord with 3-(1-methyl-2-propenyl)-cyclooctadiene.

In order to indicate still more fully the nature and utility of the invention, the following specific examples of practice representing preferred embodiments of the invention and results are set forth, it being understood that these examples are presented as illustrative, and that they are not intended to limit the scope of the invention.

EXAMPLE 1

A pressure reaction tube of 150 cc. capacity is flushed (purged) with nitrogen and charged with 50 cc. of benzene and 1 millimole of titanium tetrabutoxide. Next, 10 millimoles of diethylaluminum chloride, 7 grams (g.) of n-octatriene-1,3,7), and 5 g. of butadiene are added to the contents of the tube, and the resulting process batch is agitated for 3 hours at 40° C.

A methanol hydrochloric acid solution is thereafter added to the process batch to decompose the catalyst, and, after concentration of the solvent, fractional distillation of the batch is carried out.

As a result, 2.8 g. of 3-(3-butenyl)-cyclododecatriene-(1,5,9) is obtained.

EXAMPLE 2

A procedure generally according to that set forth in Example 1 is carried out with the use of 50 cc. of benzene, 1 millimole of titanium trichloride, 3 millimoles of diethylaluminum chloride, 7 g. of 3-methylheptatriene-(1,4,6), and 5 g. of butadiene.

As a result of 1.6 g. of 3-(1-methyl-3-propenyl)-cyclododecatriene-(1,5,9) is obtained.

EXAMPLE 3

A procedure generally according to that specified in Example 1 is carried out with the use of 50 cc. of benzene, 1 millimole of titanium tetrabromide, 3 millimoles of diethylaluminum chloride, 7 g. of n-octatriene-(1,3,7), and 5 g. of butadiene.

As a result, 1.2 g. of 3-(3-butenyl)-cyclododecatriene-(1,5,9) is obtained.

EXAMPLE 4

A pressure reaction tube of 150 cc. capacity is flushed with nitrogen and charged with 50 cc. of benzene, 1 millimole of titanium tetrachloride, and 1 millimole of tributylphosphine, and the charge is agitated. Next, 4 millimoles of diethylaluminum chloride, 7 g. of n-octatriene-(1,3,6), and 5 g. of butadiene were added, and the resulting mixture is agitated for 8 hours at 40° C. A methanol and hydrochloric acid solution is added to process batch to decompose the catalyst, and, after concentration of the solvent, fractional distillation is carried out under a vacuum.

As a result, 5.1 g. of 3-(2-butenyl)-cyclododecatriene-(1,5,9) of a boiling point of from 110 to 120° C./1.5 mm. Hg is obtained.

EXAMPLE 5

A process generally in accordance with the procedure set forth in Example 4 is carried out with the use of 50 cc. of benzene, 1 millimole of titanium butoxytrichloride, 1 millimole of triethylphosphine, 4 millimoles of diethylaluminum chloride, 7 g. of n-octatriene-(1,3,7), and 5 g. of butadiene.

As a result, 4.8 g. of 3-(3-butenyl)-cyclododecatriene-(1,5,9) is obtained.

EXAMPLE 6

A process generally in accordance with the procedure set forth in Example 4 is carried out with the use of 50 cc. of benzene, 1 millimole of titanium phenoxytrichloride, 1.5 millimoles of triphenylphosphine, 4 millimoles of diethylaluminum chloride, 7 g. of 3-methylheptatriene-(1,4,6), and 5 g. of butadiene.

As a result, 4.9 g. of 3-(1-methyl-2-propenyl)-cyclododecatriene-(1,5,9) is obtained.

EXAMPLE 7

A process generally according to the procedure of Example 4 is carried out with the use of 50 cc. of toluene, 1 millimole of titanium phenoxytrichloride, 1 millimole of triphenylantimony, 4 millimoles of diethylaluminum chloride, 7 g. of 3-methylheptatriene-(1,4,6), and 5 g. of butadiene.

As a result, 5.3 g. of 3-(1-methyl-2-propenyl)-cyclododecatriene-(1,5,9) is obtained.

EXAMPLE 8

A process generally as described in Example 4 is carried out with the use of 50 cc. of benzene, 1 millimole of titanium methoxy trichloride, 1 millimole of triphenylphosphine, 6 millimoles of diisobutylaluminum chloride, 10 g. of n-octatriene-(1,3,7), and 5 g. of butadiene.

As a result, 6.3 g. of 3-(3-butenyl)-cyclododecatriene-(1,5,9) is obtained.

EXAMPLE 9

A process generally as described in Example 4 is carried out with the use of 50 cc. of benzene, 1 millimole of titnaum dibutoxydichloride, 0.8 millimole of triethylantimony, 6 millimoles of diisobutylaluminum chloride, 8 g. of 3-methylheptatriene-(1,4,6), and 5 g. of butadiene.

As a result, 5.4 g. of 3-(1-methyl-2-propenyl)-cyclododecatriene-(1,5,9) is obtained.

EXAMPLE 10

A process generally as set forth in Example 4 is carried out with the use of 50 cc. of benzene, 1 millimole of titanyl dichloride, 1 millimole of triphenylphosphine, 4 millimoles of diethylaluminum chloride, 8 g. of 3-methylheptatriene-(1,4,6), and 5 g. of butadiene.

As a result, 7.1 g. of 3-(1-methyl-2-propenyl)-cyclododecatriene-(1,5,9) is obtained.

EXAMPLE 11

A process generally as set forth in Example 4 is carried out with the use of 50 cc. of hexane, 1 millimole of titanyl dibromide, 0.5 millimole of diphenylsulfide, 4 millimoles of diethylaluminum chloride, 8 g. of n-octatriene-(1,3,6), and 5 g. of butadiene.

As a result, 5.2 g. of 3-(2-butenyl)-cyclododecatriene-(1,5,9) is obtained.

EXAMPLE 12

A process generally as specified in Example 4 is carried out with the use of 50 cc. of heptane, 1 millimole of titanium triisopropoxybromide, 1 millimole of triphenylphosphine, 3 millimoles of ethylaluminum sesquichloride, 7 g. of 3-methylheptatriene-(1,4,6), and 5 g. of butadiene.

As a result, 4.2 g. of 3-(1-methyl-2-propenyl)-cyclododecatriene-(1,5,9) is obtained.

EXAMPLE 13

A process generally as set forth in Example 4 is carried out with the use of 50 cc. of toluene, 1 millimole of titanium tetraethoxy, 0.5 millimole of diethyl sulfide, 3 millimoles of ethylaluminum sesquichloride, 7 g. of n-octatriene-(1,3,7), and 5 g. of butadiene.

As a result, 4.2 g. of 3-(3-butenyl)-cyclododecatriene-(1,5,9) is obtained.

EXAMPLE 14

A pressure reaction tube of 150 cc. capacity is flushed with nitrogen and charged with 50 cc. of benzene, 0.5 millimole of cobalt acetylacetonate, 0.1 millimole of chromyl chloride, and 4 millimoles of triethylaluminum. Then, as the charge is cooled to −10° C., 7 g. of butadiene is added thereto, and the resulting process batch is agitated for 5 hours at a temperature of 40° C. A methanol-hydrochloric acid solution is thereafter added to the batch to decompose the catalyst, and, after concentration of the solvent, fractional distillation is carried out under a vacuum.

As a result, 2.1 g. of 3-(1-methyl-2-propenyl)-cyclododecatriene-(1,5,9) (hereinafter referred to as isobutenyl cyclododecatriene) of a boiling point of from 110 to 120° C./1.5 mm. Hg is obtained. In addition, 1.8 g. of cyclododecatriene and 2 g. of a high boiling point residue are produced.

EXAMPLE 15

A process substantially as set forth in Example 14 is carried out with the use of 50 cc. of benzene, 0.5 millimole of cobalt chloride, 0.1 millimole of chromyl chloride, 5 millimoles of triethylaluminum, and 7 g. of butadiene.

As a result, 1.4 g. of isobutenyl cyclododecatriene and 0.2 g. of 3-(2-butenyl)-cyclododecatriene-(1,5,9) (hereinafter referred to simply as butenyl cyclododecatriene) are obtained. In addition, 1.62 g. of cyclododecatriene and 2.1 g. of a high boiling point residue is produced.

EXAMPLE 16

A process generally as specified in Example 14 is carried out with the use of 50 cc. of benzene, 0.6 millimole of cobalt stearate, 0.1 millimole of anhydrous chromium chloride, 6 millimoles of triethylaluminum, and 7 g. of butadiene.

As a result, 1.8 g. of isobutenyl cyclododecatriene and 0.1 g. of butenyl cyclododecatriene are obtained. In addition, 1.1 g. of cyclododecatriene and 1.6 g. of a residue of high boiling point are produced.

EXAMPLE 17

A process generally as described in Example 14 is carried out with the use of 50 cc. of toluene, 0.5 millimole of cobalt acetoethyl acetate, 0.2 millimole of chromyl chloride, 5 millimoles of triisobutylaluminum, and 7 g. of butadiene.

As a result, 1.6 g. of isobutenyl cyclododecatriene is obtained. In addition, 2.1 g. of cyclododecatriene and 2.2 g. of a residue of high boiling point are produced.

EXAMPLE 18

A process generally as set forth in Example 14 is carried out with the use of 50 cc. of benzene, 0.5 millimole of cobalt acetylacetonate, 0.2 millimole of nickel acetylacetonate, 5 millimoles of triethylaluminum, and 7 g. of butadiene.

As a result, 0.3 g. of 3-(1-methyl-2-propenyl)-cyclooctadiene-(1,5) (hereinafter referred to as isobutenyl cyclooctadiene) and 0.2 g. of isobutenyl dodecatriene were obtained. In addition, 1.2 g. of 3-methylundecatriene, 0.8 g. of cyclododecatriene, and 0.4 g. of a residue of high boiling point are produced.

EXAMPLE 19

A process generally according to Example 14 is carried out with the use of 40 cc. of benzene, 0.5 millimole of cobalt acetylacetonate, 0.2 millimole of nickel acetate, 5 millimoles of triethylaluminum, and 7 g. of butadiene.

As a result, 0.5 g. of isobutenyl cyclooctadiene and 0.2 g. of isobutenyl cyclododecatriene are obtained. In addition, 1.1 g. of 3-methylundecatriene, 0.6 g. of cyclododecatriene, and 0.4 g. of a residue of high boiling point are produced.

EXAMPLE 20

A process generally as set forth in Example 14 is carried out with the use of 40 cc. of heptane, 0.5 millimole of cobalt acetylacetonate, 0.2 millimole of nickel cyanate, 5 millimoles of triethylaluminum, and 7 g. of butadiene.

As a result, 0.4 g. of isobutenyl cyclooctadiene and 0.2 g. of isobutenyl cyclododecatriene are obtained. In addition, 0.8 g. of 3-methylundecatriene, 0.5 g. of cyclododecatriene, and 0.6 g. of a residue of high boiling point are produced.

EXAMPLE 21

A process generally according to Example 14 is carried out with the use of 40 cc. of benzene, 0.5 millimole of iron acetylacetonate, 0.1 millimole of chromyl chloride, 5 millimoles of triethylaluminum, and 7 g. of butadiene.

As a result, 1.1 g. of isobutenyl cyclodecatriene and 0.2 g. of butenyl cyclododecatriene are obtained. In addition, 0.5 g. of cyclododecatriene and 1.2 g. of a residue of high boiling point are produced.

EXAMPLE 22

A process generally according to Example 14 is carried out with the use of 40 cc. of toluene, 0.5 millimole of anhydrous iron chloride, 0.2 millimole of chromyl chloride, 5 millimoles of triethylaluminum, and 7 g. of butadiene.

As a result, 0.7 g. of isobutenyl cyclododecatriene and 0.2 g. of butenyl cyclododecatriene are obtained. In addition, 0.8 g. of cyclododecatriene and 0.8 g. of a residue of high boiling point are produced.

EXAMPLE 23

A process generally as set forth in Example 14 is carried out with use of 40 cc. of hexane, 0.5 millimole of iron acetate, 0.2 millimole of anhydrous nickel chloride, 7 millimoles of tripropylaluminum, and 7 g. of butadiene.

As a result, 0.4 g. of isobutenyl cyclododecatriene is obtained. In addition, 0.3 g. of 3-methylundecatriene, 0.5 g. of cyclododecatriene, and 0.6 g. of a residue of high boiling point are produced.

I claim:

1. A new compound: 3-(1-methyl-2-propenyl)-cyclododecatriene.
2. A new compound: 3-(2-butenyl)-cyclododecatriene.
3. A new compound: 3-(3-butenyl)-cyclododecatriene.
4. A new compound: 3-(1-methyl-2-propenyl)-cyclooctadiene.
5. A process for producing butadiene oligomers which comprises causing butadiene-1,3 and a chain dimer representable by the general formula $$CH_2=CH-CH=CH-R$$

of butadiene-1,3 to undergo cyclic cotrimerization in contact with a Ziegler-type catalyst comprising, in combination, at least one titanium compound selected from the group consisting of titanium compounds representable by the general formulas $Ti(OR^1)_nX_{4-n}$ and $TiOX_2$, at least one electron-donor compound representable by the general formula $AR^2_m$, and at least one organic aluminum compound selected from the group consisting of aluminum compounds representable by the general formulas $$AlR_2^3X$$

and $Al_2R_3^3X_3$ thereby to form 3-R-cyclododecatriene-(1,5,9), in which formulas: R is a butenyl group selected from the group consisting of $-CH_2-CH=CH-CH_3$, $$-CH_2-CH_2-CH=CH_2$$

and

each of $R^1$, $R^2$, and $R^3$ is a hydrocarbon residue selected from the group consisting of alkyl and aryl groups; X is a halogen; A is an element selected from the group consisting of phosphorus, antimony, and sulfur; $n$ is an integer selected from the group consisting of 0, 1, 2, 3, and 4; and $m$ is a number equal to the valence of element A.

6. A process for producing butadiene oligomers according to claim 5 in which said titanium compound is preferably a member selected from the group consisting of $Ti(OR^1)_3Cl$, $Ti(OR^1)_2Cl_2$, and $Ti(OR^1)Cl_3$, where $R^1$ has a carbon number in the range of from 1 through 6.

7. A process for producing butadiene oligomers according to claim 5 in which said electron-donor compound is preferably $PR_3^2$, where $R^2$ has a carbon number in the range of from 1 through 6.

8. A process for producing butadiene oligomers according to claim 5 in which said aluminum compound is preferably $AlR_2^3Cl$, where $R^3$ has a carbon number in the range of from 1 through 6.

9. A process for producing butadiene oligomers which comprises causing butadiene to contact a catalyst comprising, in combination, at least one first transition metal compound selected from the group consisting of cobalt compounds and iron compounds, at least one second transition metal compound selected from the group consisting of chromium compounds and nickel compounds, and at least one trialkylaluminum thereby to form a butadiene cyclic oligomer having a butenyl group or an isobutenyl group.

10. A process for producing butadiene oligomers according to claim 9 in which said first transition metal compound is preferably a cobalt compound, particularly a member selected from the group consisting of diketone salts and napthenic acid salts of cobalt.

11. A process for producing butadiene oligomers according to claim 9 in which said second transition metal compound is preferably a chromium compound, particularly a member selected from the group consisting of chlorides and oxychlorides of chromium.

12. A process for producing butadiene oligomers according to claim 9 in which said trialkylaluminum is preferably $AlR_3$, where R has a carbon number in the range of from 1 through 6.

References Cited

UNITED STATES PATENTS 3,450,732   6/1969   Wilke et al. _____ 260—429

FOREIGN PATENTS 1,493,220   3/1969   Germany _____ 260—666 B

DELBERT E. GANTZ, Primary Examiner

V. O'KEEFE, Assistant Examiner